United States Patent Office 2,696,510
Patented Dec. 7, 1954

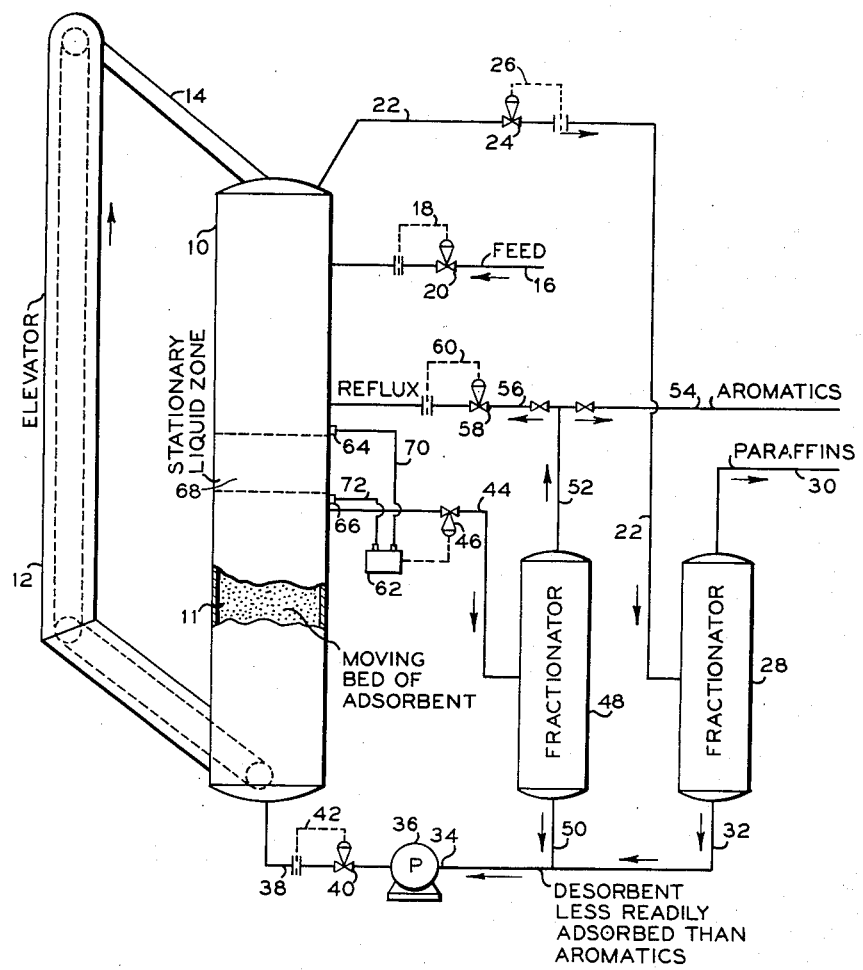

2,696,510

CONTINUOUS PROCESS FOR ADSORBTION-DESORPTION

John A. Weedman, Bartlesville, Okla., assignor to Phillips Petroleum Company, a corporation of Delaware Application December 9, 1949, Serial No. 132,018

12 Claims. (Cl. 260—674)

This invention relates to a continuous method for separating organic mixtures into constituents by selective adsorption. In one of its specific aspects the invention has particular reference to the separation of hydrocarbon mixtures containing hydrocarbons of varying degrees of saturation by continuous adsorption treatment of same in the liquid phase. In another specific embodiment, the invention relates to the recovery of fractions of differing chemical characteristics and differing adsorbability by the use of a single downwardly moving bed of solid adsorbent particles. In certain embodiments the invention pertains to the separation of petroleum stocks into paraffinic and aromatic fractions.

It has long been known to contact a liquid mixture of organic materials with solid adsorbents, usually silica gel or activated charcoal, although many other adsorbents such as activated alumina, bauxite, magnesia, etc. may be used, whereby the more readily adsorbed component or components are taken up by the solid and the less readily adsorbed component or components remain unadsorbed. In this manner a separation may be obtained between components of a two component mixture, or a complex mixture may be separated into two fractions of different characteristics according to adsorbability. By repeated treatment, three or more fractions of different character may be separated. Several methods of recovering the adsorbed material from the solid are available, including the use of a different liquid for which the solid adsorbent has more affinity than the organic material which it has adsorbed, the use of a different liquid for which the solid adsorbent has less affinity than the organic material which it has adsorbed, and removal of the adsorbed material by vaporization from the adsorbent. Thus, a hydrocarbon mixture containing paraffins and aromatics may be contacted in the liquid phase with silica gel under conditions at which the paraffins are unadsorbed and the aromatic material is adsorbed. The paraffinic material is physically separated as one product from the gel, and the latter is then treated by one of the methods mentioned to remove the aromatic material which is thus recovered as the other product.

Lately, this basic process which has long been used by batch procedures has been developed into a continuous process, in which the silica gel or other solid adsorbent, in the form of powder or small granules, is passed downwardly in "rod-like" flow in the form of a compact bed or columnar mass in contact with the hydrocarbon or other liquid material which is being treated. The liquid feed is introduced at an intermediate or low point in the column of gel, and the unadsorbed so-called raffinate is withdrawn from the top. The adsorbed material or so-called extract is separated from the gel by a number of methods, either in the same column or in a separate column; however, when recovery of extract is effected in the same column, the adsorbent is then passed to a separate column where it is conditioned for reuse in the process. In order to obtain the desired degree of separation between fractions, a portion of the extract after its recovery from the gel as a product can be returned to the adsorption system as "reflux."

The potential advantages of such a continuous process are obvious, but many difficulties are encountered in attempting to convert the batch or semi-batch procedure formerly used to a truly continuous procedure. Sufficient and adequate contact between gel and the liquid being treated is sometimes difficult to accomplish. Clean-cut separations avoiding contaminations of either raffinate or extract with each other or with certain liquid desorbents are desired but not always obtained. Particularly when a liquid desorbent, which may or may not be immiscible with the liquid being treated, also has a lower specific gravity, it is difficult to avoid mixing of liquids or loss of adsorptive capacity of the adsorbent by premature adsorption of such a desorbent liquid thereon. Furthermore, in all continuous processes heretofore developed, even when the desorption is effected in the same column of adsorbent as the adsorption by use of a more readily adsorbed liquid, the adsorbent particles of necessity are transferred to a second column for removal of the desorbent and reconditioning of the adsorbent prior to its return to the first column of the system for continuing the adsorption separation. Thus it has been necessary to employ two elevators for the particles of adsorbent with consequent undesirable losses of same by attrition.

It is an object of this invention to provide a continuous adsorption process for the fractionation of organic compounds.

It is another object of this invention to provide a continuous adsorption process for the separation of petroleum stocks into a plurality of fractions of differing characteristics.

A further object of the invention is to effect adsorption separation of liquids employing only a single moving column of adsorbent particles.

Yet another object of the invention is to minimize attrition of adsorbent particles in a continuous moving bed adsorption process by effecting adsorption, desorption, and conditioning of adsorbent for reuse, all in a single column with only one elevator being required to return the adsorbent particles from the bottom of the downwardly moving column to the top thereof for reuse.

Another object of the invention is to provide a continuous adsorption process using a single continuous non-interrupted moving column avoiding mechanical problems.

A still further object of the invention is to effect separation of an organic mixture into at least two fractions of differing characteristics in a single continuous adsorption treatment.

An additional object of the invention is to provide reflux within a moving bed of adsorbent, the flow of said reflux within the column being controlled to a desired degree both as to direction and quantity.

An additional object is to control the passage of reflux and desorption liquids within a single moving bed of adsorbent.

A further object of the invention is to enable the use of a desorbent liquid within the same column of adsorbent particles which effects adsorption separation of a liquid mixture into its components, without decreasing or destroying the adsorptive capacity of the adsorbent within the column.

An additional object of the invention is to effect the separation of a hydrocarbon mixture into saturated and unsaturated fractions by treatment of same in liquid phase with a continuously moving single bed of solid adsorbent particles.

Further objects and advantages of the invention will be apparent to one skilled in the art, from the accompanying disclosure and discussion.

In a preferred embodiment of my invention, particles of a solid adsorbent material aggregated into a columnar mass or bed are passed downwardly continuously as a moving bed in a vertical elongated column, removed from the bottom thereof, and returned to the top thereof to provide continuous operation. Into a point somewhat below the top of the downwardly moving column or bed is introduced a liquid (by liquid I mean liquid at the conditions of treatment although the material may be normally solid or normally gaseous, as well as normally liquid) organic material composed of at least two components of differing adsorbability. The more readily adsorbed component is adsorbed and carried downwardly while the less readily adsorbed component passes upwardly in the column. Into the bottom of the moving bed is introduced a liquid desorbent which is less readily adsorbed than the feed. The desorbent liquid flows upwardly in the column, and in the lower portion of same effects desorption of the more readily adsorbed component of the feed, i. e. the extract. Liquid is withdrawn from a point above the point of introduction of the desorbent but below the point of introduction of the feed in such quantity that all of the desorbent entering the bottom of the column is withdrawn. The withdrawn liquid is composed of the liquid desorbent plus the extract which has been desorbed. This material is subjected to fractional distillation to separate the extract from the liquid desorbent. A portion of the extract thus recovered is removed as product, while the remaining, usually major, portion is returned to the column as "reflux" at a point appreciably above the point of withdrawal of the desorbent-extract stream. The rate of withdrawal of the last mentioned stream is controlled and correlated with the other liquid flow so as to establish an essentially stationary liquid zone between the point of desorbent-extract withdrawal and the point of reflux extract introduction thereabove. The control of withdrawal rate is preferably accomplished by maintaining a fixed pressure differential across the desired stationary liquid zone equal to the difference in hydrostatic head at the two named points, as will be described in further detail hereinbelow. The extract material introduced above the stationary liquid zone provides a refluxing action which effects rectification within the upper portion of the column of adsorbent. This reflux extract material as it passes upwardly through the column is readsorbed by the downwardly moving adsorbent thus displacing raffinate from the adsorbent and by this rectification action providing an extract product of desired purity. Adsorbent which has passed downwardly through the adsorption zone, stationary liquid zone, and desorption zone is removed from the bottom of the column wet with liquid desorbent which, however, need not be removed as it is innocuous in the top of the column. Liquid desorbent adhering to the particles of the adsorbent which are removed from the bottom and returned to the top of the column is displaced from the gel by components of the feed and recovered from the top in the raffinate withdrawal stream. This stream is separated by fractional distillation into raffinate product, and desorbent for recycle to the bottom of the column. Accordingly, a continuous separation of feed stock into raffinate and extract is accomplished in a single unobstructed column of adsorbent particles, which as they pass downwardly adsorb the extract in a first well-defined zone and then desorb the extract in a second well-defined zone and at the same time are conditioned for reuse in the process on return to the top of the column. The raffinate stream and the extract stream withdrawn from the column as described are subjected to separate distillation or other treatment to separate the raffinate and the extract from the liquid desorbent, the latter being recovered and returned to the process.

A more detailed understanding of the various aspects of my invention may be obtained from the accompanying drawing and the following description thereof, which serves to exemplify one preferred embodiment of the invention. The drawing is a schematic showing of apparatus and flow of materials therethrough suitable for practicing the invention as applied to the treatment of a feed material to separate same into two fractions of different adsorability, for example, the separation of a hydrocarbon mixture containing paraffinc and aromatic constituents into a paraffin-rich fraction and an aromatic-rich fraction. Such a feed material may be obtained, for example, by fractionation of a natural or straight run gasoline to produce a relatively narrow boiling range cut. Naphthenic hydrocarbons may also be present, which are normally obtained in the raffinate, although the adsorption may be carried out to produce a purely paraffinic raffinate and an extract containing both aromatics and naphthenes. This choice is possible because the naphthenes are intermediate the paraffins and aromatics in ease of adsorption. The drawing is diagrammatic in character and not drawn to scale. Numerous auxiliary items of equipment such as valves, pumps, condensers, means for providing reflux and reboiling of fractionators, controls, and the like, are not shown in order to avoid confusion of the drawing, supplying of such items being well within the skill of the art having once been given the present disclosure. It will be appreciated that various modifications can be made, departing from the exact details of the system as shown in the drawing, without departing from the invention.

In the drawing, reference numeral 10 indicates a vertical elongated cylindrical shell or chamber in which the adsorption and desorption are carried out. A suitable adsorbent, for instance silica gel, is introduced into the top of chamber 10 in the form of fine particles, e. g. particles of 30 to 200 mesh size, and an aggregated columnar mass or bed 11 of the silica gel particles is maintained within chamber 10. This bed is allowed to move downwardly in rod-like flow by gravity. Gel is removed from the bottom of chamber 10 by any suitable means. In the drawing, a bucket-on-chain type of elevator 12 is shown adapted to pick up gel directly from the bottom of chamber 10 and carry it upwardly to a point above the top of chamber 10. Any other suitable means for lifting particles may be employed, such as a liquid- or gas-lift. Screw conveyors or other suitable devices can be employed if desired to transfer gel from the bottom of chamber 10 to the bottom of such a lift or the bottom of a bucket elevator. Gel lifted by elevator 12 is dumped into chute 14 and enters the top of chamber 10, thus continuing the cyclic movement of the gel through the system. Ordinarily, the elevator is within an enclosed housing as shown, connected with the bottom of column 10, and a liquid level of desorbent is maintained in the elevator housing to serve as a liquid seal.

The liquid to be separated into fractions is introduced into column 10 via line 16, preferably at a constant rate maintained by a rate of flow controller 18 operating motor valve 20, at a point somewhat below the top. Gel flows downwardly in the top part of chamber 10 and liquid flows upwardly. In passing upwardly through the descending bed of silica gel, the major portion, and preferably all, of the aromatic content of the feed is adsorbed. The percentage adsorbed depends on the ratio of gel flow rate to aromatic flow rate, temperature of treatment, height of column, character of the feed constituents, character of desorbent, concentration of desorbent, and various other factors as will be appreciated by one skilled in the art by virtue of the present disclosure. The paraffin-rich raffinate product is removed from the top of column 10 via line 22 at a rate governed by motor valve 24 controlled by rate of flow controller 26. Included in this stream is the liquid desorbent which entered the top of column 10 occluded and/or adsorbed on the silica gel introduced through inlet 14, this liquid desorbent having been displaced from the gel by the liquid feed to the process. Separation of this desorbent and the paraffinic raffinate is effected by passage of the liquid in line 22 into fractional distillation column 28 of suitable conventional design, the raffinate issuing therefrom as an overhead product through line 30, and the desorbent being recovered as a bottoms product through line 32 and recycled via line 34, pump 36, and line 38 containing motor valve 40 controlled by rate of flow controller 42, into the bottom of column 10. While the drawing illustrates the use of a liquid desorbent higher boiling than the feed components, which desorbent might for example be a naphthenic fraction boiling in the range of 130–150° C. if the feed is composed of benzene and/or toluene plus like-boiling paraffins, it will often be preferred to employ a desorbent lower boiling than the feed, such as cyclopentane with the feed just mentioned, in which event the desorbent is the overhead product of fractionator 28 and the raffinate is the bottoms product.

Sufficient liquid desorbent is added at the bottom of column 10 through line 38 to strip the adsorbed aromatics from the gel. Even though the desorbent is less readily adsorbed than the aromatics, this stripping is possible in view of the fact that adsorption-desorption is an equilibrium operation and an adsorbed liquid, such as an aromatic hydrocarbon, can be desorbed into a paraffinic or cycloparaffinic (naphthenic) hydrocarbon liquid which is sufficiently low in its content of aromatic hydrocarbon. The gel from which the aromatics have been desorbed leaves the bottom of column 10 wetted only with desorbent and is elevated to the top of the column for reuse as described. As the desorbent flows upwardly through the lower portion of the mentioned bed of gel in column 10, it becomes enriched in the aromatic components of the feed which it is desorbing from the gel. The resulting liquid is withdrawn from column 10 at an intermediate point, usually fairly close to the middle of the column with respect to its length, via line 44 at a rate controlled by motor valve 46 and is passed into fractionator 48 of conventional design. When the liquid desorbent is higher boiling than the extract, it is recovered as bottoms product from fractionator 48 by line 50 and recycled via line 34, pump 36 and line 38 to the bottom of column 10. Of course a surge tank for desorbent will be interposed in line 34 to allow for variations in flow rates, but is not shown in the drawing for the sake of simplicity. The aromatic portion of the feed which has been adsorbed and then recovered by desorption is recovered as the extract product from fractionator 48 via line 52. Part of this material is withdrawn as the net make through line 54, while another part, usually larger than the product obtained in line 54, is passed through line 56, and motor valve 58 controlled by rate of flow controller 60 back into column 10 as a reflux stream, at a point above the level of withdrawal line 44. The liquid introduced through line 56 passes upwardly through the downwardly moving bed 11 of silica gel and acts as reflux, displacing from the gel, by its own adsorption, raffinate material which has been adsorbed and/or occluded by the gel higher in the column. Of course the aromatic-rich extract material passing upwardly as reflux ultimately all becomes adsorbed by the gel and is brought back down and finally recovered through line 44.

It will thus be seen that what amounts to an internal cycle of extract material or reflux flows through line 56, column 10, line 44, fractionator 48 and line 52, while through a portion of this circuit, i. e. column 10, line 44, fractionator 48 and line 52 flows an additional quantity of extract material which enters as part of the feed through line 16 and leaves as the net extract product through line 54. However, my process is so controlled as to avoid a net liquid flow downwardly between the entry point of line 56 and the exit point of line 44, the net movement of extract material downwardly therethrough being limited to that adsorbed on the gel. This is accomplished by the use of a suitable pressure differential measuring device 62 which continuously detects the desired pressure differential between point 64 at the top of and point 66 at the bottom of the desired stationary liquid zone in column 10. With no liquid flow therethrough, the pressure differential is equal to the difference in hydrostatic pressure at the two points, plus a small kinetic effect produced by the downward motion of the gel in the column. When the relative flow rates of the various liquid streams entering and leaving column 10 are such that an upward flow of liquid occurs through the desired stationary zone 68, the pressure differential decreases and the motor valve 46 is actuated by controller 62 to permit a greater outflow through line 44, thus stopping the upward flow of liquid through zone 68. Similarly, when a downward flow of liquid occurs through that zone, the pressure differential between points 64 and 66 increases and unit 62 actuates motor valve 44 to decrease the outflow through line 44 thus equalizing the flow within column 10 to maintain the liquid within zone 68 stationary. In a preferred form, controller 62 is placed below point 66 and lines 70 and 72 leading from points 64 and 66 respectively into controller 62 are maintained liquid full, and connect with opposite sides of a pressure sensing device, such as a manometer. This arrangement in effect cancels out the differences in hydrostatic head at the two points so that the manometer is balanced when the liquid within zone 68 is stationary except for the kinetic effect of the downwardly moving bed of adsorbent mentioned above. Then that portion of the bed 11 present within zone 68 acts with respect to the manometer in device 62 in a manner analogous to an orifice in a flow meter, and unbalancing of the manometer in either direction by flow through zone 68 actuates motor valve 46 by known means to bring the manometer back into balance. If the process were attempted to be operated without the described means, at least part of the reflux introduced through line 56 would flow downwardly through zone 68 as part of the free liquid therein and fail to perform its function of rectification in the upper portion of column 10, or part of the relatively dilute solution of extract in liquid desorbent present in the lower part of column 10 would flow upwardly through zone 68 and dilute the reflux stream. While a limited amount of flow in either direction through zone 68 can be permitted in my process without serious detriment, such flow is maintained essentially zero as described.

While maintenance of the liquid in zone 68 stationary has been described by use of specific methods and devices, which are preferred, other effective means may be employed without departing from the invention in its broader scope; thus, for example, liquid flow through zone 68 may be detected visually by provision of a look box in chamber 10 at the proper level, if desired by suitable lighting and usually injection of a colored material into the liquid. In this instance, valve 46 would be controlled manually, but of course with considerably less satisfactory operation than one controlled automatically as described above. A vertical tube of small diameter may be placed within zone 68 and flow through a restricted orifice therein detected by suitable known means. These and various other procedures will be apparent to those skilled in the art as capable of employment to obtain the herein described operation of the present invention.

My process provides a continuous fractionation adsorption method for separating organic mixtures into products of differing characteristics. In addition to permitting the use of a single unobstructed column for the entire operation, the use of the less readily adsorbed desorbent in the manner described accomplishes the following. Aromatics are stripped from the gel in the lower portion of the column and the gel is thus reactivated in a form suitable for immediate reuse without further treatment. Aromatics are passed upward in the rectifying section of the column acting as reflux therein, the extent of reflux being readily controlled as desired. A desorbent material readily miscible with the products, and, if desired of a lower specific gravity, can readily be employed because it is less readily adsorbed than the extract. Heretofore only desorbents which are more readily adsorbed than the extract have been employed in continuous silica gel adsorption and in such cases it has been considered essential that the specific gravity of the desorbent be considerably greater than that of the extract in order to avoid passage of any desorbent upwardly through the column of silica gel. Such upward passage of more readily adsorbed desorbent into the body of silica gel would be highly undesirable in that it would be adsorbed at a point in the column above the desorption zone, where adsorption of aromatics is desired to take place, and thus the capacity of the silica-gel column would be reduced. It has also heretofore been considered undesirable to permit any conditions which would allow contamination of raffinate with the more readily adsorbed desorbent which is ordinarily a polar compound such as water or alcohol. In my process, no such disadvantages are present, as a positive control is provided avoiding upward flow of liquid between desorption and adsorption zones, while the liquid desorbent which is carried by the gel through the elevator and introduced into the top of the adsorption zone is of such character that it is readily displaced from the gel by the feed material, which would not be the case with the more readily adsorbed desorbents previously used in continuous silica gel adsorption processes. A desorbent is chosen which of course is readily separable from the raffinate, as well as the extract, by simple means such as fractional distillation.

In addition to the advantages set forth hereinabove and others which will be apparent to those skilled in the art on reading the present disclosure, it may be pointed out that my invention permits subjecting the adsorbent both to contact with liquid reflux and also to contact with liquid desorbent, all in a single column. Thus, the advantages of a positive reflux are obtained, together with the advantages of liquid phase desorption which minimizes or avoids altogether the subjecting of adsorbent to high temperature. It has been found more preferable to effect desorption in the liquid phase rather than to remove the extract from the adsorbent by vaporization, as this latter procedure calls for a more extended heat treatment with resulting deleterious effect on the gel, apparently the gel structure itself being affected and the gel also becoming clogged by polymerization or other degradative reactions of adsorbed hydrocarbons.

In view of the fact that the basic physical principles underlying adsorption are now well known to the art, a detailed consideration of same will not be given here. Those skilled in the art will readily understand that the exact conditions to be employed, including temperatures and relative flow rates of adsorbent, feed, and reflux, desorbent, etc. will be greatly dependent on the particular feed stream which it is desired to separate, the degree of separation chosen, and the characteristics of the particular adsorbent used. Similarly, the residence time and temperature required for satisfactory desorption are dependent on the adsorbent, the character of the extract, and the character of the desorption operation.

The process described may be applied to a wide variety of feed stocks. In addition to the types mentioned specifically hereinabove, wide boiling range gasolines may be treated to effect separation of hydrocarbons merely by type rather than by individual chemical components, virgin or cracked gas oils may be treated to separate same into a highly aromatic extract suitable for feed in making furnace type carbon black such as "Philblack" and a highly paraffinic raffinate, suitable for catalytic cracking or use as a diesel fuel, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce one or more relatively pure compounds or it may be used merely to concentrate further a desired compound in its original mixture.

Numerous non-hydrocarbons and particularly non-hydrocarbon organic liquid mixtures may be subjected to adsorption to separate same into group or individual constituents. The separation or fractionation of normally solid or normally gaseous organic compounds as well as the employment of normally solid or normally gaseous organic compounds as desorbing agent, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures, with or without using decreased temperatures. Similarly it is within the scope of this process to purify a normally solid naphthalene stock by conducting the liquid adsorption-fractionation at a moderately elevated temperature. With respect to hydrocarbon types in general, polynuclear aromatics are most readily adsorbed, mononuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbabilities of other liquids are already known to the art, or may be readily determined by trial. While certain specific materials have been described herein as the desorption liquid, various other liquids capable of effecting this are known to the art and may be used as determined by convenience or economics, taking into consideration effectiveness for desorbing a particular extract, cost, effect on adsorbent, and ease of removal from adsorbent.

by operating the process of this invention in a vertical column having a two inch inside diameter. A raffinate phase was withdrawn from the top, the feed was introduced two feet below the top, the reflux was introduced three feet below that point (five feet below the top), the desorbent was introduced at the bottom, and the extract phase was withdrawn from a point four feet above the bottom of the column. Thus the top adsorption-rectification section of the column was 5 feet long, and the desorption section was 4 feet long. There was substantially no movement of liquid within the mass of silica gel between the adsorption-rectification section and the desorption section of the column. Silica gel of 14–20 mesh size was passed downwardly through the column continuously in a compacted mass, removed from the bottom by a "gelevator," which was essentially a bucket elevator, raised and reintroduced at the top of the column. The feed was a mixture of benzene and cyclohexane, containing 15 weight per cent benzene and 85 weight per cent cyclohexane. Because the boiling points of these two materials are less than 1° C. from each other, separation of such a mixture by simple fractional distillation is almost impossible. Isooctane (2,2,4-trimethylpentane) was employed as the desorbent. The upper five feet of the column was jacketed and the gel therein maintained at a temperature of 70° F. by circulation of cooling water through the jacket, while the lower four feet of the column was jacketed and the gel therein maintained at a temperature 170° F. by passage of hot kerosene through the jacket. In the run in which these data were obtained, rather than subjecting the withdrawn extract phase, i. e. the mixture of desorbent and benzene which has been desorbed from the gel, to continuous fractional distillation with return of the desorbent to the bottom of the silica gel column and return of a portion of the benzene product to the silica gel column as reflux, the extract phase was withdrawn and passed to storage, and a synthetic reflux was used. This synthetic reflux was made up ahead of time to correspond to the composition of the benzene-rich product which would be produced; the approximate composition was known from previous runs.

The gel was sampled at two points, viz, (a) between the gel adsorption-rectification section of the column and the desorption section of the column, and (b) in the gelevator. In each case, the gel sample was obtained while allowing very little drainage of the gel particles. It was found that the benzene load on the gel in the silica gel column itself was 0.83 pound benzene per pound of dry gel. The corresponding benzene load on the gel in the gelevator was only 0.04 pound benzene per pound of dry gel. The isooctane content of the raffinate phase as shown in the table resulted from isooctane occluded by the gel lifted from the bottom of the column to the top. From the data, it will be noted that a benzene-cyclohexane mixture containing 15 per cent benzene was separated into two fractions, one containing only 2.0 weight per cent benzene and the other containing 97.0 weight per cent benzene.

The data are tabulated on the following page.

|  | Feed | Raffinate Phase | Extract Phase | Synthetic Reflux | Aromatic Product (Extract) | Gel at Middle of Column | Desorbent | Gel in Gelevator |
|---|---|---|---|---|---|---|---|---|
| Stream Material, lb./hr.: | | | | | | | | |
| Benzene | 3.75 | 0.43 | 17.78 | 14.46 | 3.32 | 18.70 | 0 | 0.90 |
| Cyclohexane | 21.25 | 20.90 | 0.55 | 0.30 | 0.10 | 0.25 | 0 | 0 |
| Isooctane | 0 | 14.15 | 15.55 | 0 | 0 | 0 | 29.70 | 14.15 |
| Dry Gel | 0 | 0 | 0 | 0 | 0 | 22.50 | 0 | 22.5 |
|  | 25.00 | 35.48 | 33.88 | 14.76 | 3.42 | 41.45 | 29.70 | 37.55 |
| Material, wt. percent: | | | | | | | | |
| Benzene | 15 | 1.2 }2.0 | 52.5 }97.0 | 98.0 | 97.0 | 99.0 | 0 | 6.0 [1] 100.0 |
| Cyclohexane | 85 | 58.9 | 1.6 | 2.0 | 3.0 | 1.0 | 0 | 0 |
| Isooctane | 0 | 39.9 | 45.9 | 0 | 0 | 0 | 100 | 94.0 |
|  | 100 | 100.0 | 100.0 | 100.0 | 100.0 | 100.0 | 100 | 100.0 |

[1] Desorbent—Free basis.

While specific and preferred embodiments of the invention have been described herein, it will be appreciated that other variations may be made in the apparatus and process without departing from the spirit and scope of the invention.

The data in the following tabulations were obtained

I claim:
1. A process for continuously separating organic compounds capable of being selectively adsorbed by contact in the liquid phase with a solid adsorbent which comprises continuously moving particles of a suitable solid adsorbent agglomerated into a columnar mass or bed downwardly in a single vertical elongated column, continuously feeding said organic compounds in the liquid phase into contact with the moving mass of adsorbent at a point below the top of said column, continuously withdrawing a liquid non-adsorbed fraction from the top of said column as a raffinate product, continuously introducing into said column at a point below the point of feeding said organic compounds a reflux stream comprising a portion of the more readily adsorbed components of said organic compounds recovered as extract product as described hereinbelow and flowing same upwardly through said column to effect rectification therein, continuously maintaining in said column a stationary zone of liquid below the point of introduction of said reflux stream, continuously introducing into the bottom of said column a liquid desorbent less readily adsorbed than said extract product portion of said organic compounds and flowing same upwardly through said column under conditions effecting desorption of the adsorbed portion of said organic compounds, continuously withdrawing from said column at a point above the bottom thereof but below said stationary liquid zone a liquid stream composed of said less readily adsorbed desorbent liquid and desorbed organic compounds, separating said last named withdrawn stream into liquid desorbent and desorbed organic compounds and returning the former to the bottom of said column, and dividing the thus-recovered desorbed organic compounds into a reflux stream which is returned to said column as aforesaid and a stream which is recovered as the net extract product.

2. A process according to claim 1, wherein said adsorbent is silica gel.

3. A process according to claim 1, wherein said liquid desorbent is lower boiling than the said organic compounds and is separated from said desorbed organic compounds by fractional distillation.

4. A process according to claim 1, wherein said liquid desorbent is higher boiling than the said organic compounds and is separated from said desorbed organic compounds by fractional distillation.

5. A process according to claim 1 wherein said organic compounds comprise aromatic and non-aromatic hydrocarbons.

6. A process according to claim 1 wherein constant flow rates are maintained for the raffinate withdrawal, feed introduction, reflux introduction, and liquid desorbent introduction streams, and liquid flow through said stationary liquid zone is prevented by control of the rate of withdrawal of the desorbent-extract stream from the column.

7. A process according to claim 1 wherein said stationary zone of liquid is maintained stationary by continuously detecting the pressure differential across said zone, and changing the flow of said withdrawn stream of liquid desorbent and extract material in response to changes in said pressure differential thus preventing flow of liquid in either direction through said zone.

8. A process according to claim 1 wherein said raffinate product stream is subjected to fractional distillation to recover the unadsorbed portion of said organic compounds as product from admixture with liquid desorbent carried into the top of said column by gel which is continuously removed from the bottom of the column and passed to the top thereof.

9. A process according to claim 6 wherein said adsorbent is silica gel.

10. A process according to claim 1 wherein said adsorbent is activated charcoal.

11. A process according to claim 1 wherein said organic compounds comprise a mixture of hydrocarbon of differing degrees of saturation.

12. A process according to claim 1 wherein said organic compounds comprise a mixture of paraffinic and aromatic hydrocarbons, and said desorbent is a cycloparaffinic hydrocarbon material.

References Cited in the file of this patent

UNITED STATES PATENTS

| Number | Name | Date |
|---|---|---|
| Re. 23,005 | Lipkin | June 8, 1948 |
| 2,470,339 | Claussen | May 17, 1949 |
| 2,564,717 | Olsen | Apr. 21, 1951 |
| 2,585,490 | Olsen | Feb. 12, 1952 |